United States Patent
Chu et al.

(10) Patent No.: US 11,849,453 B2
(45) Date of Patent: Dec. 19, 2023

(54) REPORTING BANDWIDTH CAPABILITY OF A BANDWIDTH-LIMITED COMMUNICATION DEVICE

(71) Applicant: Marvell Asia Pte Ltd, Singapore (SG)

(72) Inventors: Liwen Chu, San Ramon, CA (US); Lei Wang, San Diego, CA (US); Hongyuan Zhang, Fremont, CA (US); Yakun Sun, San Jose, CA (US); Jinjing Jiang, San Jose, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 393 days.

(21) Appl. No.: 15/486,192

(22) Filed: Apr. 12, 2017

(65) Prior Publication Data

US 2017/0295571 A1 Oct. 12, 2017

Related U.S. Application Data

(60) Provisional application No. 62/321,708, filed on Apr. 12, 2016.

(51) Int. Cl.
*H04W 72/04* (2023.01)
*H04W 72/21* (2023.01)
(Continued)

(52) U.S. Cl.
CPC .............. *H04W 72/21* (2023.01); *H04W 8/22* (2013.01); *H04W 72/51* (2023.01); *H04W 76/10* (2018.02); *H04W 84/12* (2013.01)

(58) Field of Classification Search
CPC ... H04W 72/0413; H04W 8/22; H04W 76/10; H04W 72/048; H04W 84/12
See application file for complete search history.

(56) References Cited

U.S. PATENT DOCUMENTS 8,626,216 B2 * 1/2014 Higuchi ............ H04W 74/0816
455/509
8,699,442 B2 * 4/2014 Noh .................. H04W 74/0808
370/329

(Continued)

OTHER PUBLICATIONS

IEEE Std 802.11™ 2012 (Revision of IEEE Std 802.Nov. 2007) IEEE Standard for Information technology - Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

(Continued)

*Primary Examiner* — Bailor C Hsu

(57) ABSTRACT

A first communication device generates a first physical layer (PHY) data unit that includes information indicating a capability to use a channel bandwidth greater than a maximum channel bandwidth of the first communication device, and transmits the first PHY data unit to a second communication device during an association process with the second communication device. The first communication device generates a second PHY data unit that includes information indicating a capability to use at most the maximum channel bandwidth of the first communication device, and transmits the second PHY data unit to the second communication device when the first communication device is associated with the second communication device.

26 Claims, 7 Drawing Sheets

(51) Int. Cl.
*H04W 8/22* (2009.01)
*H04W 76/10* (2018.01)
*H04W 72/51* (2023.01)
*H04W 84/12* (2009.01)

(56) References Cited

U.S. PATENT DOCUMENTS

| | | | | |
|---|---|---|---|---|
| 8,711,821 | B2* | 4/2014 | Grandhi | H04B 7/0626 370/338 |
| 8,811,426 | B1* | 8/2014 | Banerjea | H04W 72/02 370/468 |
| 8,995,257 | B2* | 3/2015 | Chu | H04W 40/246 370/230 |
| 9,215,747 | B2* | 12/2015 | Lee | H04W 72/0446 |
| 9,392,524 | B2* | 7/2016 | Grandhi | H04W 52/04 |
| 9,414,267 | B2* | 8/2016 | Li | H04L 5/0053 |
| 9,516,647 | B2* | 12/2016 | Seok | H04W 72/0453 |
| 9,820,304 | B2* | 11/2017 | Gong | H04W 74/0816 |
| 9,900,878 | B2* | 2/2018 | Seok | H04W 72/042 |
| 9,913,296 | B2* | 3/2018 | Seok | H04W 74/085 |
| 2004/0029612 | A1* | 2/2004 | Gorsuch | H04W 48/18 370/333 |
| 2011/0110349 | A1 | 5/2011 | Grandhi | |
| 2011/0222486 | A1* | 9/2011 | Hart | H04L 5/0055 375/267 |
| 2011/0243083 | A1* | 10/2011 | Zhang | H04W 8/22 370/329 |
| 2011/0255620 | A1* | 10/2011 | Jones, IV | H04L 27/22 375/260 |
| 2012/0207036 | A1* | 8/2012 | Ong | H04W 72/04 370/252 |
| 2012/0327915 | A1* | 12/2012 | Kang | H04L 5/0007 370/336 |
| 2013/0070701 | A1* | 3/2013 | Merlin | H04W 74/002 370/329 |
| 2013/0128816 | A1* | 5/2013 | Li | H04W 28/20 370/328 |
| 2013/0194920 | A1* | 8/2013 | Chu | H04W 40/246 370/230 |
| 2013/0315219 | A1* | 11/2013 | Cheong | H04L 5/0044 370/338 |
| 2014/0016587 | A1* | 1/2014 | Sayenko | H04L 5/0094 370/329 |
| 2015/0103722 | A1 | 4/2015 | Seok | |
| 2015/0117436 | A1 | 4/2015 | Jafarian | |
| 2015/0181560 | A1* | 6/2015 | Jamadagni | H04B 7/2621 370/329 |
| 2015/0334751 | A1 | 11/2015 | Alanen et al. | |
| 2016/0105888 | A1 | 4/2016 | Seok | |
| 2016/0381704 | A1 | 12/2016 | Chu et al. | |
| 2017/0202011 | A1* | 7/2017 | Trainin | H04W 52/0216 |
| 2017/0237532 | A1 | 8/2017 | Li et al. | |
| 2017/0295571 | A1 | 10/2017 | Chu et al. | |
| 2017/0338935 | A1 | 11/2017 | Ahn et al. | |
| 2018/0054739 | A1* | 2/2018 | Dutta | H04W 74/0808 |
| 2018/0235025 | A1* | 8/2018 | Chen | H04L 5/0092 |
| 2019/0116545 | A1* | 4/2019 | Verma | H04W 8/24 |
| 2019/0215884 | A1* | 7/2019 | Patil | H04W 52/0216 |
| 2020/0015219 | A1* | 1/2020 | Asterjadhi | H04W 72/23 |
| 2021/0359885 | A1* | 11/2021 | Shellhammer | H04L 27/2614 |

OTHER PUBLICATIONS

IEEE Std 802.11-REVmc™/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

IEEE Std 802.11ac/D7.0 "Draft Standard for Information Technology-Telecommunications and information exchange between systems—Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11ax™/D0.5, "Draft Standard for Information technology - Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

International Search Report and Written Opinion in International Patent Application No. PCT/US2017/027219, dated Jun. 23, 2017 (15 pages).

International Preliminary Report on Patentability in International Patent Application No. PCT/US2017/027219, dated Oct. 16, 2018 (9 pages).

Chun et al., "Legacy Support on HEW frame structure," doc: IEEE 11-13/1057r0, *The Institute of Electrical and Electronics Engineers, Inc.*, pp. 1-8 (Sep. 2013).

IEEE Std 802.11-REVmc™M/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).

IEEE Std 802.11ac™—2013 "IEEE Standard for Information Technology-Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

IEEE Std. 802.11n™ "IEEE Standard for Information Technology-Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

Kwon et al., "SIG Field Design Principle for 11ax," Newracon, doc. IEEE 802.11-15/0344r2, Mar. 2015, 18 pages.

Seok et al., "HEW PPDU Format for Supporting MIMO-OFDMA," IEEE 802.11-14/1210r0, 16 pages, (Sep. 14, 2014).

Stacey, "Specification Framework for TGax," doc. IEEE 802.11-15/0132r12, vol. 802.11ax, No. 12, 38 pages (Dec. 1, 2015).

U.S. Appl. No. 16/262,355, Chu et al., "Operation with Bandwidth-Limited Devices in a Wireless Network," filed Jan. 30, 2019.

Seok et al. "Notification of Operating Mode Changes," Doc. No. IEEE 802.11-15/1034r0 (Sep. 13, 2015), 11 pages.

* cited by examiner

REPORTING BANDWIDTH CAPABILITY OF A BANDWIDTH-LIMITED COMMUNICATION DEVICE

CROSS REFERENCES TO RELATED APPLICATIONS

This application claims the benefit of U.S. Provisional Patent App. No. 62/321,708, entitled "HE 20 MHZ ONLY DEVICES IN 5 GHZ BAND," filed on Apr. 12, 2016, the disclosure of which is hereby expressly incorporated herein by reference in its entirety.

FIELD OF TECHNOLOGY

The present disclosure relates generally to wireless communication systems, and more particularly wireless communication devices reporting bandwidth capabilities to other communication devices.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method includes: generating, at a first communication device, a first physical layer (PHY) data unit that includes information indicating a capability to use a channel bandwidth greater than a maximum channel bandwidth of the first communication device; causing the first communication device to transmit the first PHY data unit to a second communication device during an association process with the second communication device; generating, at the first communication device, a second PHY data unit that includes information indicating a capability to use at most the maximum channel bandwidth of the first communication device; and causing the first communication device to transmit the second PHY data unit to the second communication device when the first communication device is associated with the second communication device.

In another embodiment, an apparatus comprises a network interface device associated with a first communication device, the network interface device including one or more integrated circuits (ICs). The network interface device includes a physical layer (PHY) processor implemented using the one or more ICs, and the one or more ICs are configured to: generate a PHY data unit that includes information indicating a capability to use a channel bandwidth greater than a maximum channel bandwidth of the first communication device; cause the first communication device to transmit the first PHY data unit to a second communication device during an association process with the second communication device; generate a second PHY data unit that indicates capability to use at most the maximum channel bandwidth of the first communication device; and cause the first communication to transmit the second PHY data unit to the second communication device when the first communication device is associated with the second communication device.

In yet another embodiment, a method includes: generating, at a first communication device, a first physical layer (PHY) data unit that includes information indicating a capability to use a channel bandwidth greater than a maximum channel bandwidth of the first communication device; causing the first communication device to transmit the first PHY data unit to a second communication device during an association process with the second communication device; generating, at the first communication device, a second PHY data unit that includes information indicating a capability to use at most the maximum channel bandwidth of the first communication device; and causing the first communication device to transmit the second PHY data unit to the second communication device i) during the association process and ii) after the first communication device transmits the first PHY data unit.

In still another embodiment, an apparatus comprises a network interface device associated with a first communication device, the network interface device including one or more integrated circuits (ICs). The network interface device includes a physical layer (PHY) processor implemented using the one or more ICs, and the one or more ICs are configured to: generate a first PHY data unit that includes information indicating a capability to use a channel bandwidth greater than a maximum channel bandwidth of the first communication device; cause the first communication device to transmit the first PHY data unit to a second communication device during an association process with the second communication device; generate a second PHY data unit that includes information indicating a capability to use at most the maximum channel bandwidth of the first communication device; and cause the first communication device to transmit the second PHY data unit to the second communication device i) during the association process and ii) after the first communication device transmits the first PHY data unit.

DETAILED DESCRIPTION

In embodiments described below, a bandwidth-limited wireless communication device (e.g., the communication device is capable of using at most a maximum frequency bandwidth (i.e., a maximum supported channel frequency bandwidth) that is less than a maximum bandwidth defined by a communication protocol), when associating with an access point (AP), reports to the AP a capability to use a bandwidth greater than the maximum bandwidth of the bandwidth-limited wireless communication device. For example, if the maximum bandwidth of a bandwidth-limited HE (high efficiency) wireless communication device is 20 MHz, the bandwidth-limited communication device reports to a VHT (very high throughput) AP, during an association process, where the VHT AP assumes the bandwidth-limited HE wireless communication device supports VHT features which at least supports 80 MHz, for example, the bandwidth-limited wireless communication device is capable of using a bandwidth such as 40 MHz, 80 MHz, etc. After the bandwidth-limited wireless communication device becomes associated with the AP, the bandwidth-limited wireless communication device reports to the AP that the bandwidth-limited wireless communication device can utilize at most the maximum bandwidth of the bandwidth-limited wireless communication device.

Embodiments of methods and apparatus are described below in the context of a wireless local area network (WLAN) merely for explanatory purposes. In other embodiments, methods and apparatus such as described below are utilize in other suitable networks such as wired local area networks, metropolitan area networks (MANs), wide area networks (WANs), mobile wireless networks, etc.

Figure 1:
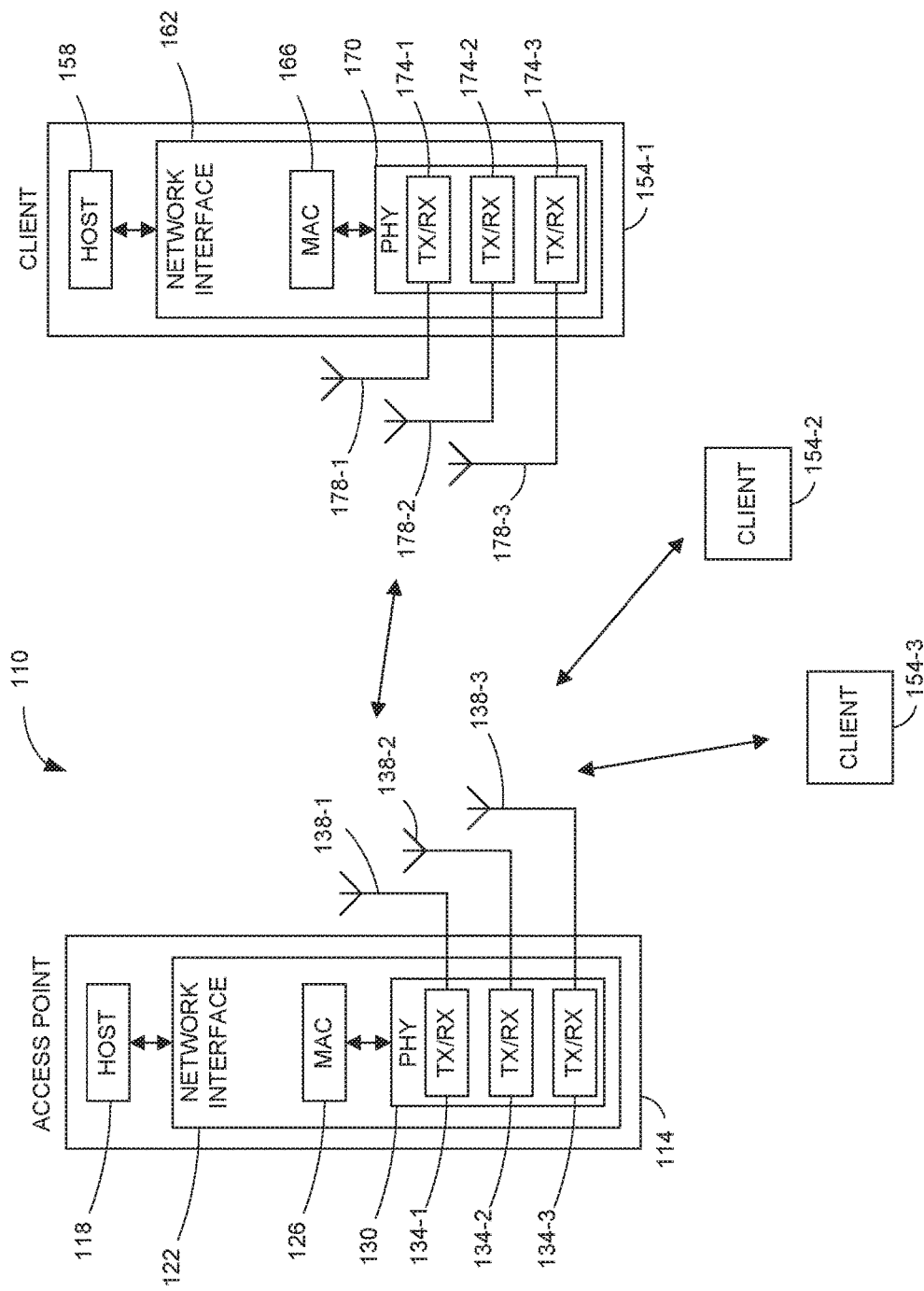
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized. The PHY processor 130 includes circuitry, coupled to the antennas 138, that is configured to upconvert baseband signals to radio frequency (RF) signals for transmission via the antennas 138. The PHY processor 130 also includes circuitry, coupled to the antennas 138, that is configured to downconvert RF signals received via the antennas 138 to baseband signals. Such upconvert and downconvert circuitry may be included, at least partially, in the transceivers 134, in some embodiments.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. The PHY processor 130 may be configured to cause the AP 114 to transmit a signal by providing a baseband signal that includes a PPDU to the circuitry configured to upconvert baseband signals to RF signals. The circuitry configured to upconvert baseband signals to RF signals responsively provides the RF signal that includes the PPDU to the antennas 138.

Similarly, the PHY processor 130 may be configured to receive PHY data units that were received via the antennas 138, and extract MAC layer data units encapsulated within the PHY data units. For example, the circuitry configured to downconvert RF signals to baseband signals may output a baseband signal that includes a received PPDU, and the PHY processor 130 may extract one or more MAC layer data units encapsulated in the PPDU. The PHY processor 130 may provide the extracted MAC layer data units to the MAC processor 126, which processes the MAC layer data units.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized. The PHY processor 170 includes circuitry, coupled to the antennas 178, that is configured to upconvert baseband signals to RF signals for transmission via the antennas 178. The PHY processor 170 also includes circuitry, coupled to the antennas 178, that is configured to downconvert RF signals received via the antennas 178 to baseband signals.

Such upconvert and downconvert circuitry may be included, at least partially, in the transceivers 174, in some embodiments.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. The PHY processor 170 may be configured to cause the client station 154-1 to transmit a signal by providing a baseband signal that includes a PPDU to the circuitry configured to upconvert baseband signals to RF signals. The circuitry configured to upconvert baseband signals to RF signals responsively provides the RF signal that includes the PPDU to the antennas 178.

Similarly, the PHY processor 170 may be configured to receive PHY data units that were received via the antennas 178, and extract MAC layer data units encapsulated within the PHY data units. For example, the circuitry configured to downconvert RF signals to baseband signals may output a baseband signal that includes a received PPDU, and the PHY processor 170 may extract one or more MAC layer data units encapsulated in the PPDU. The PHY processor 170 may provide the extracted MAC layer data units to the MAC processor 166, which processes the MAC layer data units.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
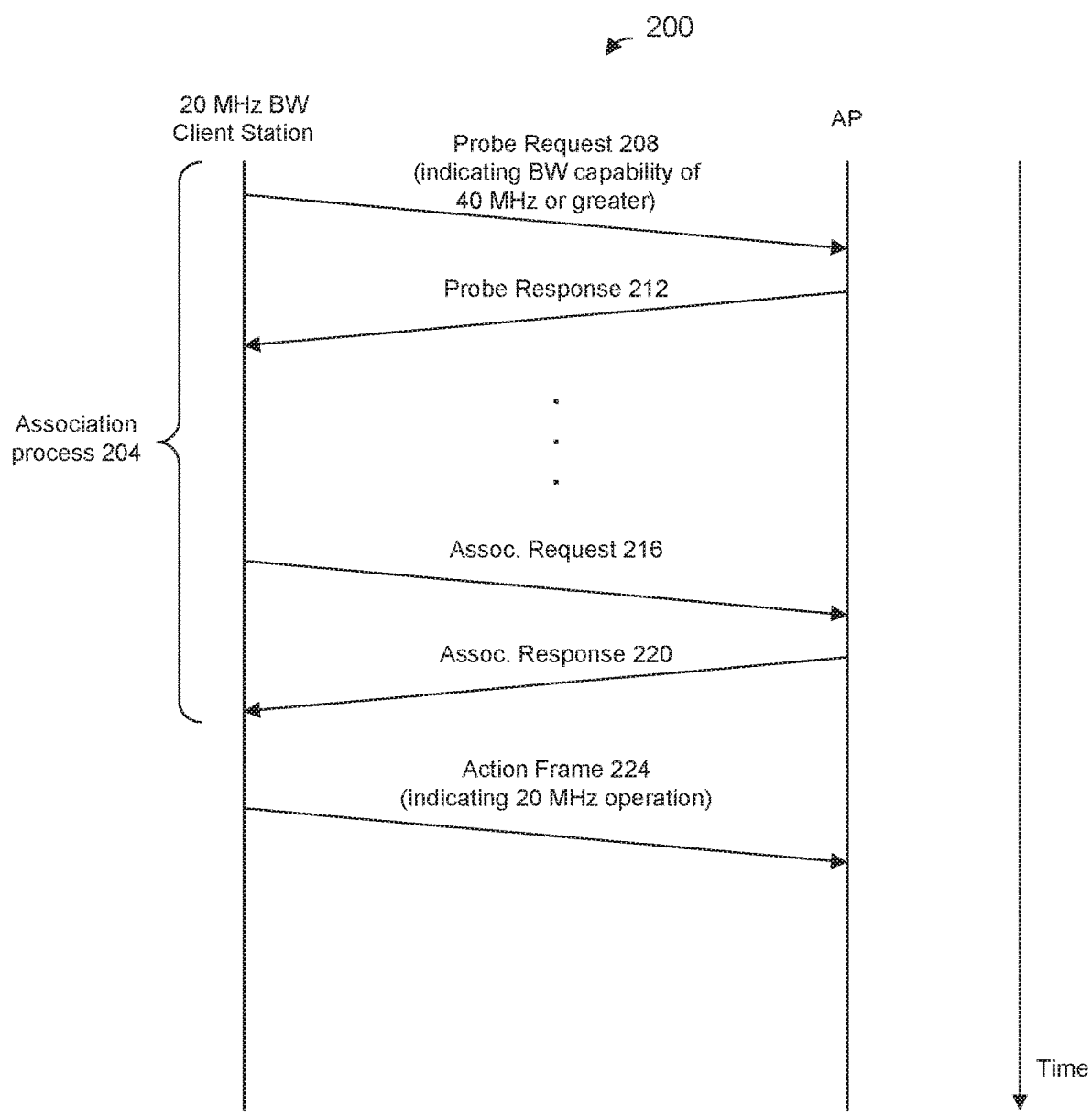
FIG. 2 is a timing diagram of an example communication frame sequence in which a bandwidth-limited client station reports bandwidth capabilities to an access point (AP) of a WLAN, according to an embodiment.

FIG. 2 is a timing diagram of an example communication frame sequence 200 involving an association process 204 between a bandwidth-limited client station and an AP, according to an embodiment. As will be described in more detail below, the client station reports bandwidth capabilities multiple times during the sequence 200.

The AP and the client station are configured to operate according to a communication protocol that permits use of channels having bandwidths greater than the maximum channel bandwidth of the client station, and the AP is capable of using one or more channel bandwidths greater than the maximum channel bandwidth of the client station. According to one illustrative embodiment, the communication protocol permits use of a channel having a bandwidth of 40 MHz, 80 MHz, 160 MHz, etc., whereas the maximum channel bandwidth of the client station is 20 MHz. In other embodiments, the maximum channel bandwidth of the client station is a suitable bandwidth other than 20 MHz (e.g., 1 MHz, 5 MHz, 10 MHz, etc.), and the communication protocol permits use of suitable bandwidths other than 40 MHz, 80 MHz, 160 MHz, etc.

The client station transmits a probe request frame 208 to the AP, where the probe request frame includes a field that indicates the client station is capable of using a channel bandwidth that is greater than the maximum channel bandwidth of the client station. In an embodiment, the probe request frame 208 includes a field that indicates the client station is capable of using a channel bandwidth of 40 MHz, whereas the maximum channel bandwidth of the client station is 20 MHz. In another embodiment, the probe request frame 208 includes a field that indicates the client station is capable of using a channel bandwidth of 80 MHz, whereas the maximum channel bandwidth of the client station is 20 MHz. In other embodiments, the maximum channel bandwidth of the client station is a suitable bandwidth other than 20 MHz (e.g., 1 MHz, 5 MHz, 10 MHz, etc.) and the probe request frame 208 includes a field that indicates the client station is capable of using a channel bandwidth other than 40 MHz or 80 MHz.

The AP generates a probe response frame 212 and, in response to the probe request frame 208, transmits the probe response frame 212 to the client station. Subsequently, the client station generates and transmits an association request frame 216. The AP generates an association response frame 220 and, in response to the association request frame 216, transmits the association response frame 220 to the client station. The association response frame 220 includes information that indicates to the client station that the client station has become associated with the AP. Upon receiving the association response frame 220, the client station is associated with the AP and the association process 204 ends. During the association process 204, the client station and the AP may exchange other communication frames (not shown in FIG. 2) prior to the association request frame 216 and the association response frame 220, such as communication frames corresponding to authentication.

The client station generates an action frame 224, and after the association process 204 is ended, the client station transmits the action frame 224 to the AP. In an embodiment, the action frame 224 includes a field that indicates the client station can utilize at most the maximum bandwidth of the client station. In an embodiment, the probe request frame 208 includes a field that indicates the client station is capable of using a channel bandwidth of 40 MHz, whereas the field of the action frame 224 indicates that the client station can use a maximum channel bandwidth of 20 MHz. In another embodiment, the probe request frame 208 includes a field that indicates the client station is capable of using a channel bandwidth of 80 MHz, whereas the field of the action frame 224 indicates that the client station can use a maximum channel bandwidth of 20 MHz.

In an embodiment, the client station transmits the action frame 224 in response to the client station determining that the client station has become associated with the AP and/or that the association process 204 has ended. In an embodiment, the client station transmits the action frame 224 in response to receiving the association response frame 220. For example, in response to i) determining that the client station has become associated with the AP and/or ii) receiving the association response 220, the client station may transmit the action frame 224 at a next available opportunity, e.g., when the client station determines that a wireless medium utilized by the WLAN is idle.

Figure 3:
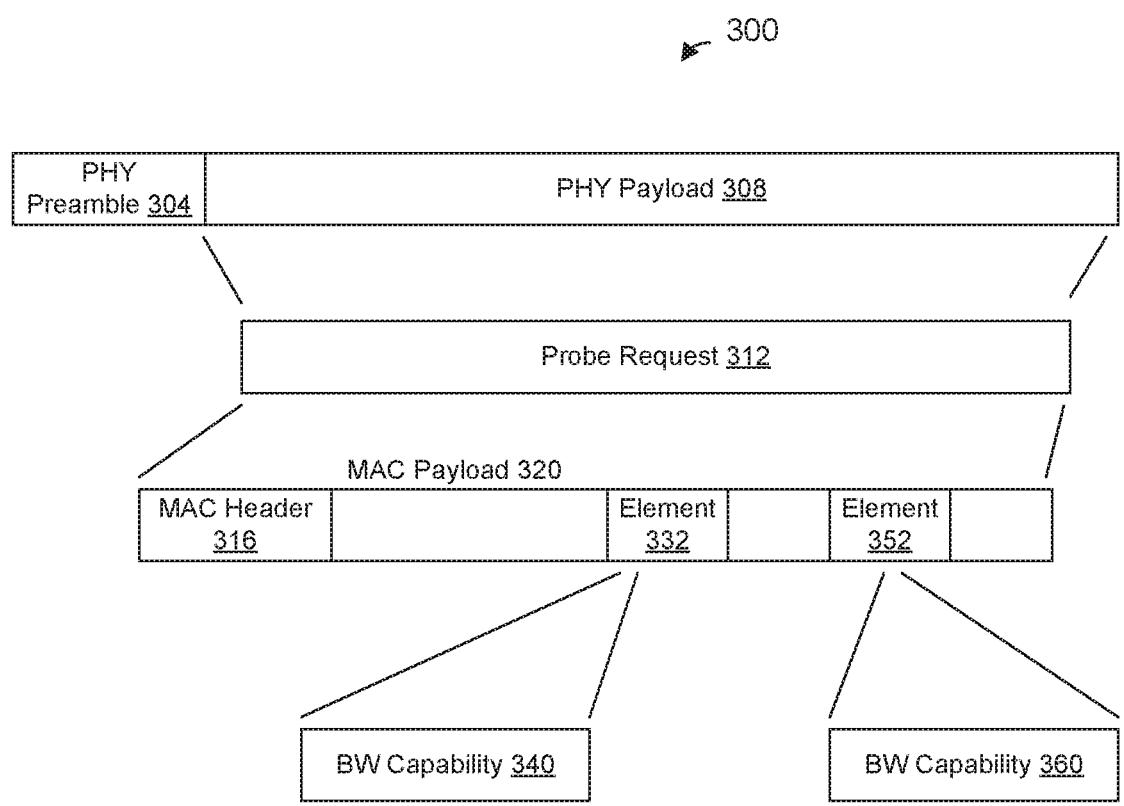
FIG. 3 is a block diagram of an example physical layer (PHY) data unit that includes a probe request frame, which a bandwidth-limited client station uses to report bandwidth capabilities to an AP, according to an embodiment.

The communication frames illustrated in FIG. 2 are transmitted within PHY data units according to an embodiment. For instance, FIG. 3 is a diagram of a PHY data unit 300 (e.g., a PPDU) that includes the probe request frame 208 of FIG. 2, according to an embodiment. The PHY data unit 300 includes a PHY preamble 304 and a PHY payload 308. In an embodiment, the PHY preamble 304 includes one or more training fields for one or more of signal detection, synchronization, automatic gain control (AGC) adjustment, channel estimation, etc. In an embodiment, the PHY preamble 304 includes one or more PHY header fields that include PHY information regarding the PHY payload 308, such as a modulation utilized for the PHY payload 308, a length of the PHY data unit 300, etc.

The PHY payload 308 includes a probe request frame 312, in an embodiment. Referring to FIG. 1, in an embodiment, the MAC processor 166 generates the probe request frame 312 and provides the probe request frame 312 to the PHY processor 170. The PHY processor 170 then generates the PHY data unit 300 to encapsulate the probe request frame 312, including generating the PHY preamble 304.

The probe request frame 312 includes a MAC header 316 and a MAC payload 320. The MAC header 316 includes MAC layer information such as a destination address, duration information regarding the probe request frame 312, etc. The MAC payload 320 includes an information element 332, which in turn includes a field 340 that indicates a maximum bandwidth that the client station is capable of using. In an embodiment, the MAC processor 166 generates the field 340 to indicate that the client station is capable of using a bandwidth that is greater than the maximum bandwidth that the client station is actually capable of using.

In an embodiment, the element 332 is an HT capabilities information element as defined by the IEEE 802.11 Standard, and the field 340 is a Supported Channel Width Set field as also defined by the IEEE 802.11 Standard. In this embodiment, the MAC processor 166 generates the Supported Channel Width Set field 340 to indicate that the client station is capable of using a 40 MHz-wide channel, whereas the client station is actually capable of using at most a 20 MHz-wide channel.

In an embodiment, the MAC payload 320 optionally also includes an information element 352, which in turn includes a field 360 that indicates a maximum bandwidth that the client station is capable of using. In an embodiment, the MAC processor 166 generates the field 360 to indicate that the client station is capable of using a bandwidth that is greater than the maximum bandwidth that the client station is actually capable of using.

In an embodiment, the element 352 is a VHT capabilities information element as defined by the IEEE 802.11 Standard, and the field 360 is a Supported Channel Width Set field as also defined by the IEEE 802.11 Standard. In this embodiment, the MAC processor 166 generates the Supported Channel Width Set field 360 to indicate that the client station is capable of using an 80 MHz-wide channel, whereas the client station is actually capable of using at most a 20 MHz-wide channel.

Figure 4:
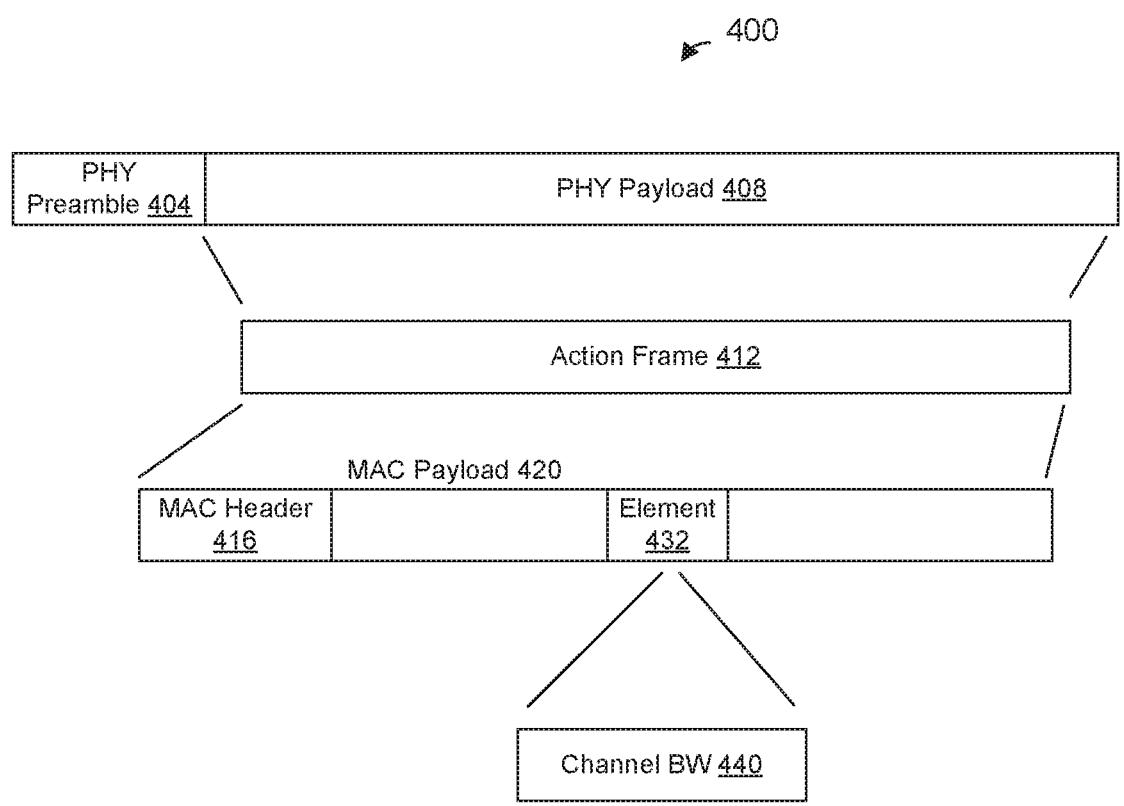
FIG. 4 is a block diagram of an example PHY data unit that includes an action frame, which a bandwidth-limited client station uses to report bandwidth capabilities to an AP, according to an embodiment.

FIG. 4 is a diagram of a PHY data unit 400 (e.g., a PPDU) that includes the action frame 224 of FIG. 2, according to an embodiment. The PHY data unit 400 includes a PHY preamble 404 and a PHY payload 408. In an embodiment, the PHY preamble 404 includes one or more training fields for one or more of signal detection, synchronization, AGC adjustment, channel estimation, etc. In an embodiment, the PHY preamble 404 includes one or more PHY header fields that include PHY information regarding the PHY payload 408, such as a modulation utilized for the PHY payload 408, a length of the PHY data unit 400, etc.

The PHY payload 408 includes an action frame 412, in an embodiment. Referring to FIG. 1, in an embodiment, the MAC processor 166 generates the action frame 412 and provides the action frame 412 to the PHY processor 170. The PHY processor 170 then generates the PHY data unit 400 to encapsulate the action frame 412, including generating the PHY preamble 404.

The action frame 412 includes a MAC header 416 and a MAC payload 420. The MAC header 416 includes MAC layer information such as a destination address, duration information regarding the action frame 412, etc. The MAC payload 420 includes an information element 432, which in turn includes a field 440 that indicates a maximum bandwidth that the client station can use. In an embodiment, the MAC processor 166 generates the field 440 to indicate that the client station can use a bandwidth no greater than the maximum bandwidth of the client station.

In an embodiment, the action frame 412 is a Notify Channel Width frame as defined by the IEEE 802.11 Standard, the element 432 is a Notify Channel Width action field as defined by the IEEE 802.11 Standard, and the field 440 is a Channel Width field as also defined by the IEEE 802.11 Standard. In this embodiment, the MAC processor 166 generates the Channel Width field 440 to indicate that the client station is capable of receiving using at most a 20 MHz-wide channel.

In another embodiment, the action frame 412 is an Operating Mode Notification frame as defined by the IEEE 802.11 Standard, the element 432 is an Operating Mode Notification element as defined by the IEEE 802.11 Standard, and the field 440 is a Channel Width field within an Operating Mode field of the Operating Mode Notification element as also defined by the IEEE 802.11 Standard. In this embodiment, the MAC processor 166 generates the Channel Width field 440 to indicate that the client station is capable of receiving using at most a 20 MHz-wide channel.

In other embodiments, the frame 412 is another suitable communication frame that permits the client station to report that the client station is capable of receiving using at most a 20 MHz-wide channel. For example, the frame 412 may be an association request frame that includes an Operating Mode Notification element as defined by the IEEE 802.11 Standard, and the field 440 is a Channel Width field within an Operating Mode field of the Operating Mode Notification element as also defined by the IEEE 802.11 Standard. In this embodiment, the MAC processor 166 generates the Channel Width field 440 to indicate that the client station is capable of receiving using at most a 20 MHz-wide channel. As another example, the frame 412 may be a reassociation request frame that includes an Operating Mode Notification element as defined by the IEEE 802.11 Standard, and the field 440 is a Channel Width field within an Operating Mode field of the Operating Mode Notification element as also defined by the IEEE 802.11 Standard. In this embodiment, the MAC processor 166 generates the Channel Width field 440 to indicate that the client station is capable of receiving using at most a 20 MHz-wide channel.

Figure 5:
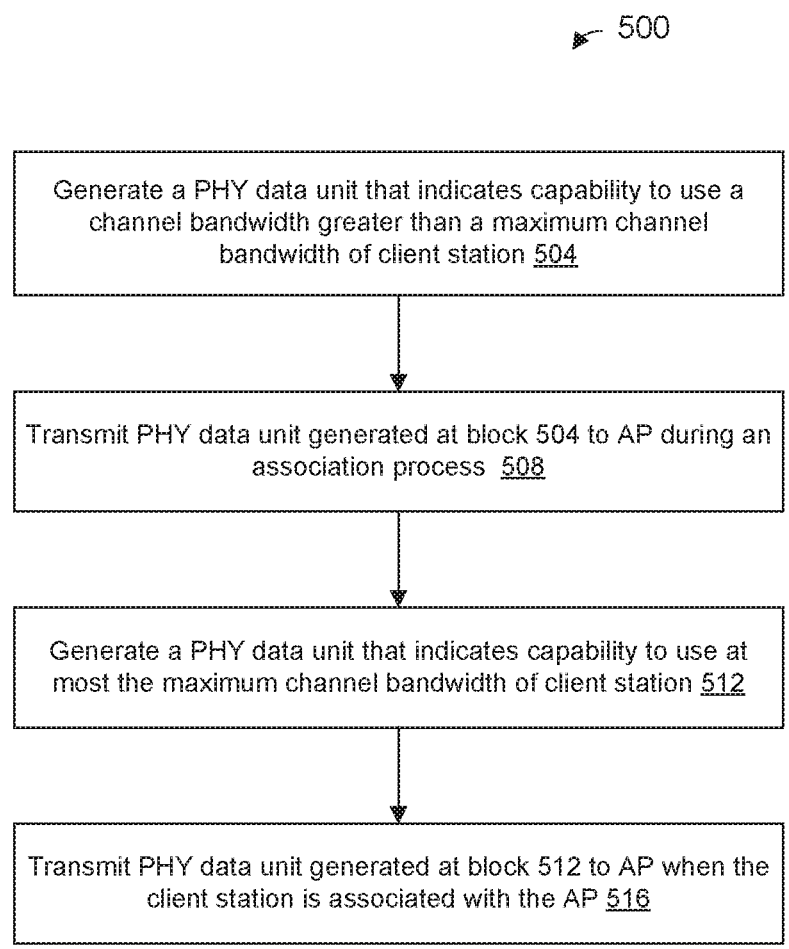
FIG. 5 is a flow diagram of an example method for a bandwidth-limited client station to report bandwidth capabilities to an AP of a WLAN, according to an embodiment.

FIG. 5 is a flow diagram of an example method 500 for a bandwidth-limited client station to report bandwidth capabilities to an AP of a WLAN, according to an embodiment.

In some embodiments, the network interface device 162 of FIG. 1 is configured to implement the method 500. The method 500 is described, however, in the context of the network interface device 162 merely for explanatory purposes and, in other embodiments, the method 500 is implemented by another suitable device.

At block 504, the network interface device 162 generates a PHY data unit (e.g., a PPDU) that includes information reporting that the client station 154-1 is capable of using a channel bandwidth that is greater than a maximum channel bandwidth of the client station 154-1. At block 508, the client station 154-1 transmits the PHY data unit generated at block 504 to an AP during an association process with the AP.

In an embodiment, the PHY data unit generated at block 504 includes a probe request frame as discussed above with respect to FIG. 2. In an embodiment, the PHY data unit generated at block 504 is the PHY data unit 300 of FIG. 3. In other embodiments, the PHY data unit generated at block 504 is another suitable PHY data unit that includes information reporting that the client station 154-1 is capable of using a channel bandwidth that is greater than the maximum channel bandwidth of the client station 154-1.

At block 512, the network interface device 162 generates a PHY data unit (e.g., a PPDU) that includes information reporting that the client station 154-1 can use at most the maximum channel bandwidth of the client station 154-1. At block 516, the client station 154-1 transmits the PHY data unit generated at block 512 to the AP when the client station has become associated with the AP. In an embodiment, the client station 154-1 transmits the PHY data unit generated at block 512 after the association process has ended. In an embodiment, the client station 154-1 transmits the PHY data unit generated at block 512 to the AP in response to at least one of i) determining that the client station 154-1 has become associated with the AP, and ii) receiving an association response frame from the AP indicating that the client station 154-1 has become associated with the AP. For example, in response to i) determining that the client station has become associated with the AP and/or ii) receiving the association response frame, the client station 154-1 may transmit the PHY data unit generated at block 512 at a next available opportunity, e.g., when the client station 154-1 determines that a wireless medium utilized by the WLAN is idle.

In an embodiment, the PHY data unit generated at block 512 includes an action frame as discussed above with respect to FIG. 2. In an embodiment, the PHY data unit generated at block 512 is the PHY data unit 400 of FIG. 4. In other embodiments, the PHY data unit generated at block 512 is another suitable PHY data unit that includes information reporting that the client station 154-1 is capable of using at most the maximum channel bandwidth of the client station 154-1.

Figure 6:
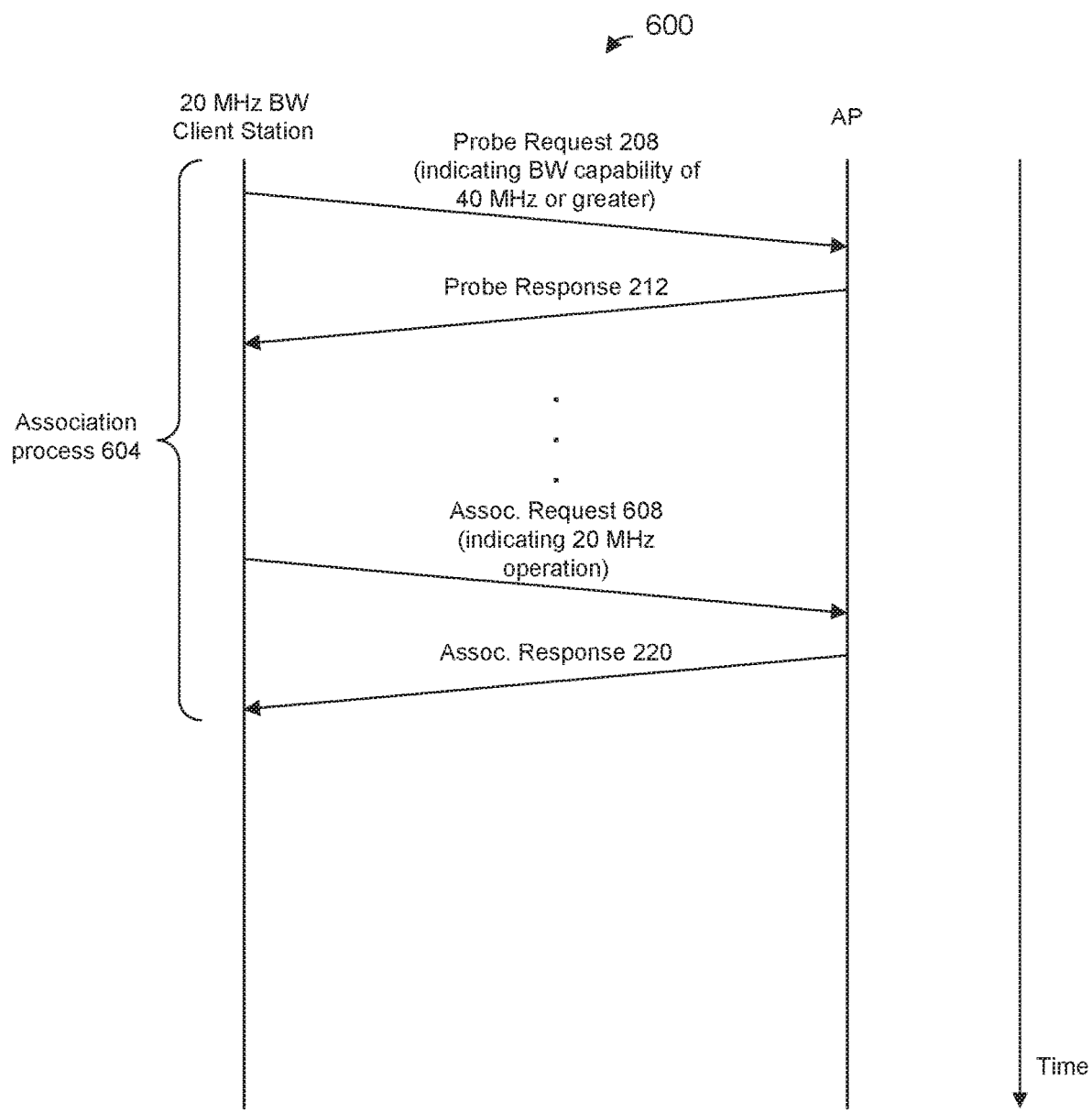
FIG. 6 is a timing diagram of another example communication frame sequence in which a bandwidth-limited client station reports bandwidth capabilities to an AP, according to another embodiment.

FIG. 6 is a timing diagram of an example communication frame sequence 600 involving an association process 604 between a bandwidth-limited client station and an AP, according to another embodiment. The sequence 600 is similar to the sequence 200 of FIG. 2, and like-numbered elements are not described in detail for purposes of brevity.

During the association process 604, the client station generates and transmits an association request frame 608. The association request frame 608 is transmitted after the client station receives the probe response frame 212. The association request frame 608 includes information that reports to the AP that the client station is capable of receiving using at most a 20 MHz-wide channel. For example, the association request frame 608 includes an Operating Mode Notification element as defined by the IEEE 802.11 Standard. Referring to FIG. 4, the association request frame 608 may have a structure similar to the action frame 412, where the element 432 is the Operating Mode Notification element, and the field 440 is a Channel Width field within an Operating Mode field of the Operating Mode Notification element as also defined by the IEEE 802.11 Standard. In this embodiment, the MAC processor 166 generates the Channel Width field 440 to indicate that the client station is capable of receiving using at most a 20 MHz-wide channel.

The AP generates an association response frame 220 and, in response to the association request frame 608, transmits the association response frame 220 to the client station. The association response frame 220 includes information that indicates to the client station that the client station has become associated with the AP. Upon receiving the association response frame 220, the client station is associated with the AP and the association process 604 ends. During the association process 204, the client station and the AP may exchange other communication frames (not shown in FIG. 2) prior to the association request frame 608 and the association response frame 220, such as communication frames corresponding to authentication.

The communication frames illustrated in FIG. 6 are transmitted within PHY data units according to an embodiment.

Figure 7:
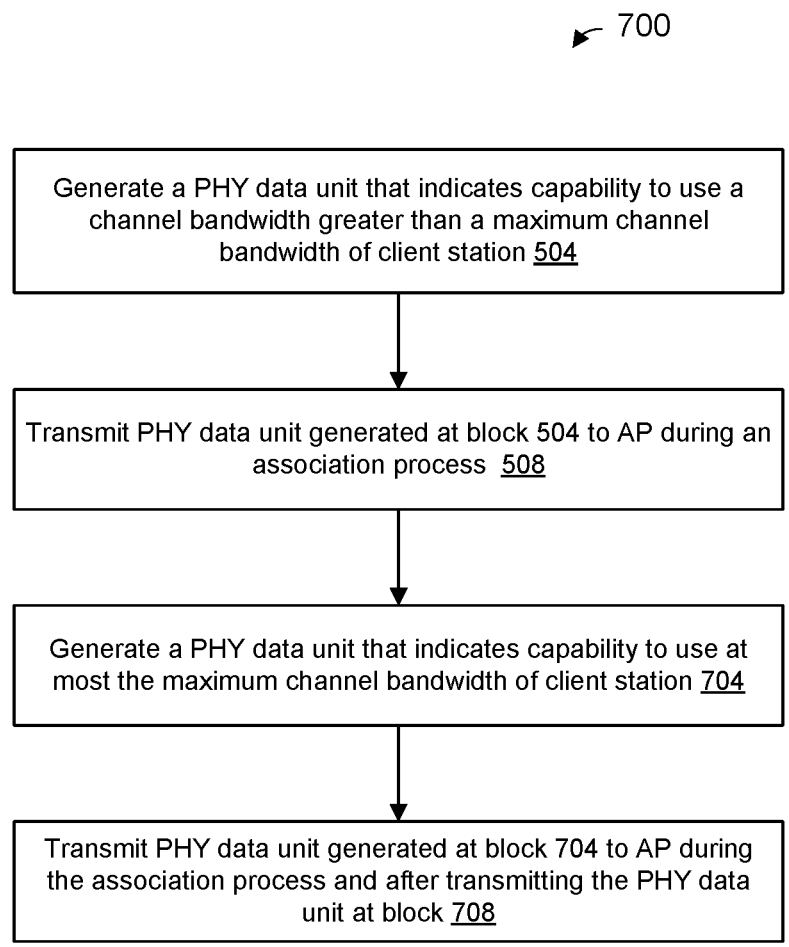
FIG. 7 is a flow diagram of another example method for a bandwidth-limited client station to report bandwidth capabilities to an AP of a WLAN, according to another embodiment.

FIG. 7 is a flow diagram of an example method 700 for a bandwidth-limited client station to report bandwidth capabilities to an AP of a WLAN, according to an embodiment. In some embodiments, the network interface device 162 of FIG. 1 is configured to implement the method 700. The method 700 is described, however, in the context of the network interface device 162 merely for explanatory purposes and, in other embodiments, the method 700 is implemented by another suitable device.

The flow diagram 700 is similar to the flow diagram 500 of FIG. 5, and like-numbered elements are not described in detail for purposes of brevity.

At block 704, the network interface device 162 generates a PHY data unit (e.g., a PPDU) that includes information reporting that the client station 154-1 can use at most the maximum channel bandwidth of the client station 154-1. For example, the PHY data unit generated at block 704 may include an association request frame, as discussed above with respect to FIG. 6, that includes information that reports to the AP that the client station is capable of receiving using at most a 20 MHz-wide channel. For example, the association request frame includes an Operating Mode Notification element as defined by the IEEE 802.11 Standard, an Operating Mode field, which includes a Channel Width field set to a value to indicate that the client station is capable of receiving using at most a 20 MHz-wide channel.

At block 708, the client station 154-1 transmits the PHY data unit generated at block 704 to the AP during the association process and after transmitting the PHY data unit at block 508.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
generating, at a first communication device, a first physical layer (PHY) data unit that includes information indicating a capability of the first communication device to use a channel frequency bandwidth i) that is greater than a maximum supported channel frequency bandwidth of the first communication device, and ii) that the first communication device can never use;
causing the first communication device to transmit, when the first communication device is actually capable of ever using at most the maximum supported channel frequency bandwidth of the first communication device, the first PHY data unit to a second communication device during an association process with the second communication device;
generating, at the first communication device, a second PHY data unit that includes information indicating a capability of the first communication device to use at most the maximum supported channel frequency bandwidth of the first communication device; and
causing the first communication device to transmit the second PHY data unit to the second communication device after the first communication device transmits the first PHY data unit and during a time period when the first communication device is associated with the second communication device.

2. The method of claim 1, wherein causing the first communication device to transmit the second PHY data unit to the second communication device includes:
causing the first communication device to transmit the second PHY data unit to the second communication device in response to determining that the association process with the second communication device has ended.

3. The method of claim 1, wherein causing the first communication device to transmit the second PHY data unit to the second communication device includes:
causing the first communication device to transmit the second PHY data unit to the second communication device in response to at least one of i) determining that the first communication device has become associated with the second communication device and ii) receiving, at the first communication device, an association response frame indicating that the first communication device has become associated with the second communication device.

4. The method of claim 1, wherein the first PHY data unit includes a probe request frame, the probe request frame including the information indicating the capability of the first communication device to use the channel frequency bandwidth greater than the maximum supported channel frequency bandwidth of the first communication device.

5. The method of claim 4, wherein the information indicating the capability of the first communication device to use the channel frequency bandwidth greater than the maximum supported channel frequency bandwidth of the first communication device is included in an information element of the probe request frame.

6. The method of claim 1, wherein:
the maximum supported channel frequency bandwidth of the first communication device is 20 MHz; and
the first PHY data unit includes information that indicates a capability to use a channel frequency bandwidth greater than 20 MHz.

7. The method of claim 6, wherein the first PHY data unit includes information that indicates capability to use a channel frequency bandwidth of (i) 40 MHz or (ii) 80 MHz.

8. The method of claim 1, wherein the second PHY data unit includes an action frame, the action frame including the information indicating the capability of the first communication device to use at most the maximum supported channel frequency bandwidth of the first communication device.

9. The method of claim 8, wherein the information indicating the capability of the first communication device to use at most the maximum supported channel frequency bandwidth of the first communication device is included in an information element of the action frame.

10. The method of claim 8, wherein:
causing the first communication device to transmit the first PHY data unit includes providing, at the first communication device, a baseband signal that includes the first PHY data unit to circuitry configured to upconvert the baseband signal to a radio frequency for transmission; and
causing the first communication device to transmit the second PHY data unit includes providing, at the first communication device, a baseband signal that includes the second PHY data unit to the circuitry configured to upconvert the baseband signal to a radio frequency for transmission.

11. An apparatus, comprising:
a network interface device associated with a first communication device, the network interface device including one or more integrated circuits (ICs);
wherein the network interface device includes a physical layer (PHY) processor implemented using the one or more ICs, wherein the one or more ICs are configured to:
generate a PHY data unit that includes information indicating a capability of the first communication device to use a channel frequency bandwidth i) that is greater than a maximum supported channel frequency bandwidth of the first communication device, and ii) that the first communication device can never use,
cause the first communication device to transmit, when the first communication device is actually capable of ever using at most the maximum supported channel frequency bandwidth of the first communication device, the first PHY data unit to a second communication device during an association process with the second communication device,
generate a second PHY data unit that indicates capability of the first communication device to use at most the maximum supported channel frequency bandwidth of the first communication device, and cause the first communication to transmit the second PHY data unit to the second communication device after the first communication device transmits the first PHY data unit and during a time period when the first communication device is associated with the second communication device.

12. The apparatus of claim 11, wherein the one or more ICs are configured to:
cause the first communication device to transmit the second PHY data unit to the second communication device in response to determining that the association process with the second communication device has ended.

13. The apparatus of claim 11, wherein the one or more ICs are further configured to:
cause the first communication device to transmit the second PHY data unit to the second communication device in response to at least one of i) determining that the first communication device has become associated with the second communication device and ii) receiving an association response frame from the second communication device indicating that the first communication device has become associated with the second communication device.

14. The apparatus of claim 11, wherein the one or more ICs are configured to generate the first PHY data unit to include a probe request frame, the probe request frame including the information indicating the capability of the first communication device to use the channel frequency bandwidth greater than the maximum supported channel frequency bandwidth of the first communication device.

15. The apparatus of claim 14, wherein the network interface device includes a media access control layer (MAC) processor implemented using the one or more ICs, wherein the MAC processor is configured to generate an information element of the probe request frame that includes the information indicating the capability of the first communication device to use the channel frequency bandwidth greater than the maximum supported channel frequency bandwidth of the first communication device.

16. The apparatus of claim 11, wherein:
the maximum supported channel frequency bandwidth of the first communication device is 20 MHz; and
the one or more ICs are configured to generate the first PHY data unit to include information that indicates a capability of the first communication device to use a channel frequency bandwidth greater than 20 MHz.

17. The apparatus of claim 16, wherein the one or more ICs are configured to generate the first PHY data unit to include information indicating a capability of the first communication device to use a channel frequency bandwidth of (i) 40 MHz or (ii) 80 MHz.

18. The apparatus of claim 11, wherein the one or more ICs are configured to generate the second PHY data unit to include an action frame, the action frame including the information indicating the capability of the first communication device to use at most the maximum supported channel frequency bandwidth of the first communication device.

19. The apparatus of claim 18, wherein the one or more ICs are configured to generate an information element of the action frame that includes the information indicating the capability of the first communication device to use at most the maximum supported channel frequency bandwidth of the first communication device.

20. The apparatus of claim 18, wherein:
the PHY processor includes circuitry configured to upconvert baseband signals to radio frequency signals for transmission; and
the PHY processor is configured to:
cause the first communication device to transmit the first PHY data unit at least by providing a baseband signal that includes the first PHY data unit to the circuitry configured to upconvert baseband signals to radio frequency signals, and
cause the first communication device to transmit the second PHY data unit at least by providing a baseband signal that includes the second PHY data unit to the circuitry configured to upconvert baseband signals to radio frequency signals.

21. A method, comprising:
generating, at a first communication device, a first physical layer (PHY) data unit that includes information indicating a capability of the first communication device to use a channel frequency bandwidth i) that is greater than a maximum supported channel frequency bandwidth of the first communication device, and ii) that the first communication device can never use;
causing the first communication device to transmit, when the first communication device is actually capable of ever using at most the maximum supported channel frequency bandwidth of the first communication device, the first PHY data unit to a second communication device during an association process with the second communication device;
generating, at the first communication device, a second PHY data unit that includes information indicating a capability of the first communication device to use at most the maximum supported channel frequency bandwidth of the first communication device; and
causing the first communication device to transmit the second PHY data unit to the second communication device i) during the association process and ii) after the first communication device transmits the first PHY data unit.

22. The method of claim 21, wherein:
the first PHY data unit includes information that indicates capability of the first communication device to use a channel frequency bandwidth of (i) 40 MHz or (ii) 80 MHz; and
the second PHY data unit includes information that indicates capability of the first communication device to receive via a channel having at most a channel frequency bandwidth of 20 MHz.

23. The method of claim 21, wherein:
the second PHY data unit includes an association request frame that includes the information indicating the capability of the first communication device to use at most the maximum supported channel frequency bandwidth of the first communication device.

24. An apparatus, comprising:
a network interface device associated with a first communication device, the network interface device including one or more integrated circuits (ICs);
wherein the network interface device includes a physical layer (PHY) processor implemented using the one or more ICs, wherein the one or more ICs are configured to:
generate a first PHY data unit that includes information indicating a capability to use a channel frequency bandwidth i) that is greater than a maximum supported channel frequency bandwidth of the first communication device, and ii) that the first communication device can never use, cause the first communication device to transmit, when the first communication device is actually capable of ever using at most the maximum supported channel frequency bandwidth of the first communication device, the first PHY data unit to a second communication device during an association process with the second communication device, generate a second PHY data unit that includes information indicating a capability to use at most the maximum supported channel frequency bandwidth of the first communication device, and cause the first communication device to transmit the second PHY data unit to the second communication device i) during the association process and ii) after the first communication device transmits the first PHY data unit.

25. The apparatus of claim 24, wherein the one or more ICs are configured to:

generate the first PHY data unit to include information that indicates capability to use a channel frequency bandwidth of (i) 40 MHz or (ii) 80 MHz; and generate the second PHY data unit to include information that indicates capability to receive via a channel having at most a channel frequency bandwidth of 20 MHz.

26. The apparatus of claim 24, wherein the one or more ICs are configured to:

generate the second PHY data unit to include an association request frame that includes the information indicating the capability to use at most the maximum supported channel frequency bandwidth of the first communication device.

* * * * *